United States Patent [19]

Nonami

[11] Patent Number: 5,237,592
[45] Date of Patent: Aug. 17, 1993

[54] CONTROL DEVICE FOR RADIO COMMUNICAITON APPARATUS

[75] Inventor: Takayuki Nonami, Hyogo, Japan

[73] Assignee: Mitsubishi Denki Kabushiki Kaisha, Tokyo, Japan

[21] Appl. No.: 667,906

[22] Filed: Mar. 12, 1991

[30] Foreign Application Priority Data

Jul. 6, 1990 [JP] Japan .................................. 2-178991

[51] Int. Cl.⁵ .............................................. H04L 7/00
[52] U.S. Cl. ...................................... 375/106; 370/93; 340/825.06
[58] Field of Search ................ 375/106, 107, 114, 116; 370/104.1, 93; 455/12, 51; 340/825.06, 825.44

[56] References Cited

U.S. PATENT DOCUMENTS

| 3,838,221 | 9/1974 | Schmidt et al. | 375/107 |
| 3,872,437 | 3/1975 | Cross | 375/107 |
| 4,506,262 | 3/1985 | Vance et al. | 340/825.44 |
| 4,712,212 | 12/1987 | Takai et al. | 370/104 |

OTHER PUBLICATIONS

J. Matsushima et al., "New Mobile Radiotelephone Equipment for Overseas Markets", Technical Journal of Mitsubishi Electric Corp., vol. 60, No. 10, 1986.

Primary Examiner—Stephen Chin
Attorney, Agent, or Firm—Rothwell, Figg, Ernst & Kurz

[57] ABSTRACT

Disclosed herein is a control device which is suitable for use in a radio communication apparatus employed in a radio communication system using a TDMA method. A timer circuit for circulating a counted value in a period corresponding to a period of time required to transmit a TDMA frame supplies the counted value to a strobe signal generating circuit. The strobe signal generating circuit supplies a strobe signal to a radio unit of the radio communication apparatus when a preset value coincides with the counted value of the timer circuit. Thus, since the strobe signal is generated without the intervention by a control circuit made up of a CPU or the like, it can be outputted in strict timing.

28 Claims, 16 Drawing Sheets

CONTROL DEVICE FOR RADIO COMMUNICAITON APPARATUS

BACKGROUND OF THE INVENTION

1. Field of the Invention

This invention relates to a control device suitable for use in a radio communication apparatus employed in a radio communication system using a time-division multiple access method.

2. Description of the Related Art

FIG. 1 is a block diagram showing the structure of a mobile station using a mobile radiotelephone system as a conventional radio communication apparatus, which is disclosed in, for example, the technical journal issued by Mitsubishi Electric Corp., Vol. 60, No. 10, p.p. 55-59, 1986. In the same drawing, there are shown a transmitting and receiving antenna 1, an antenna sharing unit 2 provided to transmit waves and receive them by a single antenna, a transmitting unit 3 for performing modulation and amplification of a transmission signal, a frequency synthesizer 4 for oscillating necessary frequencies, a receiving unit 5 for demodulating signals in a predetermined band, a control unit 6 for controlling respective units, a base-band signal processing unit 7 for processing sound signals, a microphone 8, and a speaker 9. FIG. 2 is a block diagram showing the structure of the control unit 6 constructed by a microcomputer. In the same drawing, there are shown a CPU 10, a RAM 11 from which data are read and in which the data are written, a ROM 12 in which a program is stored, a timer circuit 13, input/output ports (hereinafter called "I/O ports") 141 to 146 for interfacing to the outside, and a bus 16.

The operation of the control unit 6 will now be described. The CPU 10 is operated in accordance with the program stored in the ROM 12. More specifically, the CPU 10 supplies necessary control signals to the transmitting unit 3, the frequency synthesizer 4, the receiving unit 5 (these are collectively called "a radio unit", and a unit, which is related to the transmission, in the radio unit will hereinafter called "a radio transmitting unit"), and the base-band signal processing unit 7 through the I/O ports 141 to 146, and receives necessary information from them. When the time control is required while they are being controlled by the CPU 10, the CPU 10 causes the timer circuit 13 to produce a timer interrupt signal thereby performing the real-time control in accordance with the timer interrupt signal. When it is desired to treat a transmitting-unit start signal (hereinafter called "TXON") for example, output ports each of which has been allotted to the TXON are rendered active during a predetermined period of time after radio channels are allotted. As soon as the radio communication is terminated, the output ports are thereafter rendered inactive during the predetermined period of time.

The CPU 10 supplies the control signals such as TXON, etc. to the radio unit through the I/O ports 141 to 146 in the above-described manner. Thus, when the radio communication is made in accordance with a frequency division multiple access system (hereinafter called "FDMA system"), the operation of the radio unit is made regularly and hence the radio unit is activated without any problem under the above control of the CPU 10. However, when the radio communication is carried out in accordance with a time division multiple access system (hereinafter called "TDMA system") like, for example, the following mobile radiotelephone system (standard number IS-54) which has been discussed at the TIA in U.S.A., the operation of the radio communication apparatus is made intermittently. More specifically, as shown in FIG. 3, the transmission and reception must be performed only with respect to time slots allotted in one TDMA frame. FIG. 3 shows one example in which tri-multiple TDMA system is adopted. Therefore, if the TXON is taken as an example, it is necessary to output a TXON according to the time slots allotted in the TDMA frame as shown in FIG. 4.

The control device suitable for use in the conventional radio communication apparatus (hereinafter called merely "control device") is constructed as described above. Therefore, the control device is accompanied by the problem that since the CPU 10 directly performs the input/output control of the control signal, the control signal required to be inputted and/or outputted in the form of a microsecond order cannot be inputted and/or outputted in the accurate timing even when the timer interrupt operations are often used where the radio communication is made by the TDMA system. Even when the control device activated at high speed as the CPU 10 or other peripheral circuit is used, a problem arises in that the power consumption is increased and the control device becomes expensive.

SUMMARY OF THE INVENTION

With the foregoing problems in view, it is therefore an object of the present invention to provide a versatile control device capable of processing a control signal in accurate timing even when the radio communication is made in accordance with a TDMA system and capable of easily carrying out a change in setting of the input/output timing of the control signal. It is another object of the present invention to provide a control device which can easily realize the timing control in a transmission system hard to control.

According to one aspect of the present invention, there is provided a control device comprising a timer circuit for counting the number of master clocks supplied from the outside and capable of changing values obtained at the time a predetermined number of master clocks designated by a control circuit are counted by the timer circuit to values at the time of a start in the counting so as to perform the periodic operation according to a TDMA frame period; and a strobe signal generating circuit for comparing one of the counted values outputted from the timer circuit and one of values set by the control circuit so as to output a strobe signal to a radio unit when they coincide with each other.

The above-described strobe signal generating circuit generates a strobe signal when one of the periodically counted values outputted from the timer circuit becomes equal to a preset value, and also provides the control timing that the radio unit requires without the intervention by the control circuit.

According to another aspect of the present invention, there is provided a control device comprising a first timer circuit for counting the number of master clocks supplied from the outside and capable of changing values obtained at the time a predetermined number of master clocks designated by a control circuit are counted by the first timer circuit to values at the time of a start in the counting so as to perform the periodic operation according to a TDMA frame period; a first strobe signal generating circuit for comparing one of the counted values outputted from the first timer circuit and one of values set by the control circuit so as to output a strobe signal to a radio unit when they coincide with each other; a comparing circuit for comparing one of the counted values outputted from the first timer circuit and a timing correction value set by the control circuit so as to output a trigger signal when they coincide with each other; a second timer circuit for counting the number of master clocks in response to the trigger signal outputted from the comparing circuit; and a second strobe signal generating circuit for comparing one of counted values outputted from the second timer circuit and a preset value for transmission set by the control circuit so as to output a strobe signal to a radio transmitting unit when they coincide with each other.

The above-described comparing circuit outputs a trigger signal when one of the periodic counted values outputted from the first timer circuit becomes equal to the preset timing correction value. The strobe signal to be outputted to the radio transmitting unit, which is produced by the second timer circuit and the second strobe signal generating circuit, is one subjected to the timing correction by a value corresponding to the timing correction value.

The above and other objects, features and advantages of the present invention will become apparent from the following description and the appended claims, taken in conjunction with the accompanying drawings in which preferred embodiments of the present invention are shown by way of illustrative example.

DETAILED DESCRIPTION OF THE PREFERRED EMBODIMENTS

Figure 1:
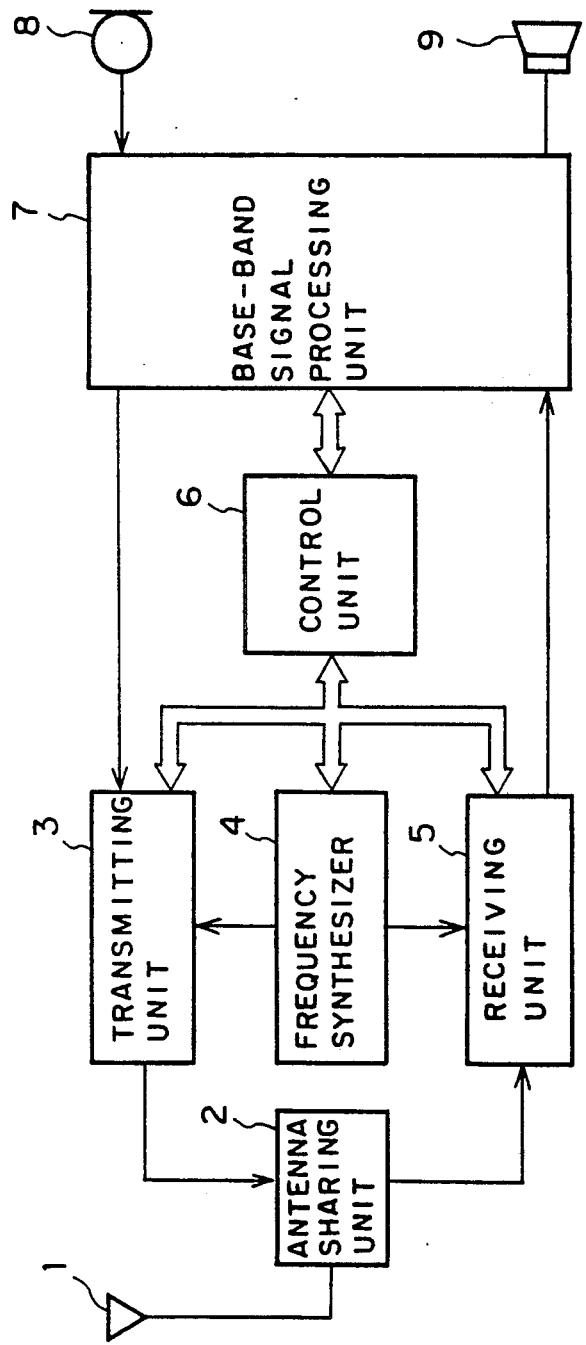
FIG. 1 is a block diagram showing a mobile station using a mobile radiotelephone system.
Figure 2:
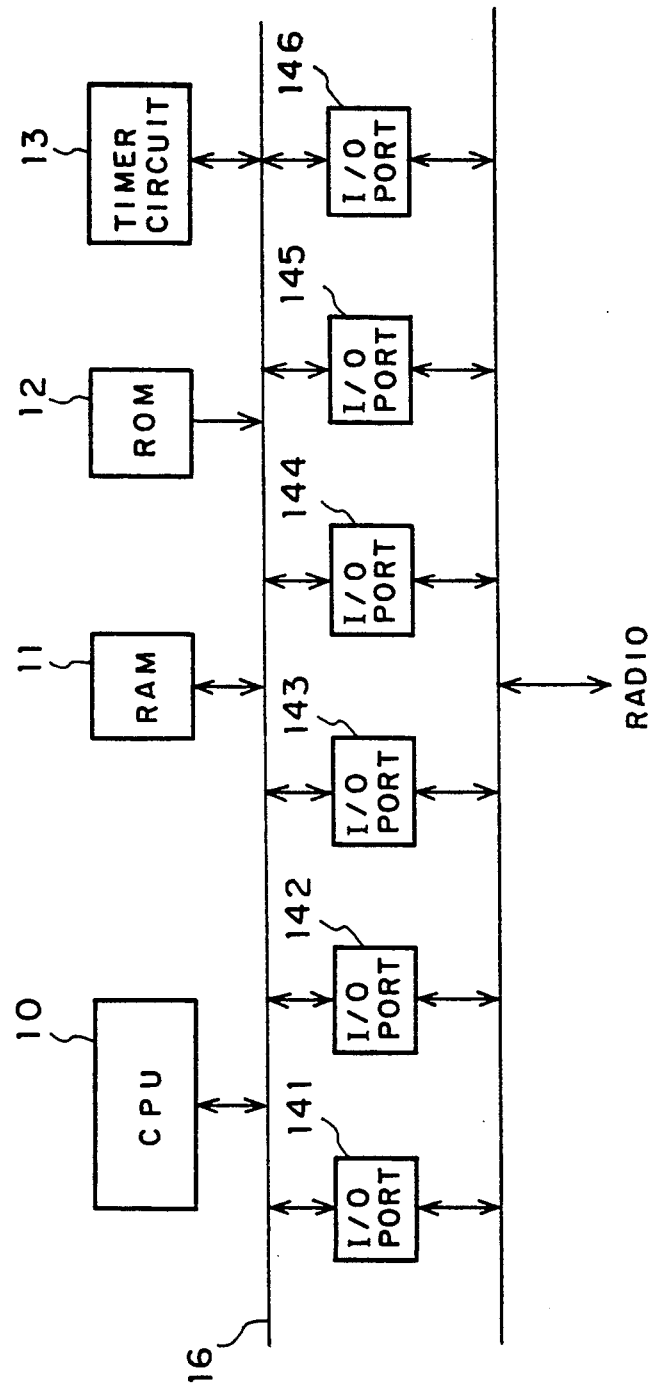
FIG. 2 is a block diagram depicting a conventional control device.
Figure 3:
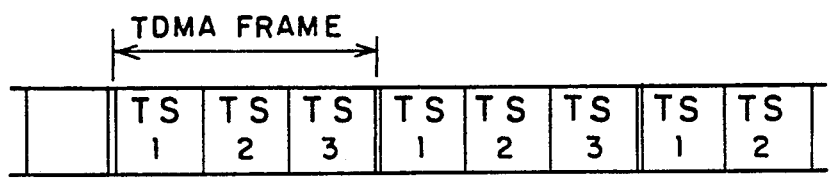
FIG. 3 is a diagram for describing one example of a TDMA frame.
Figure 4:
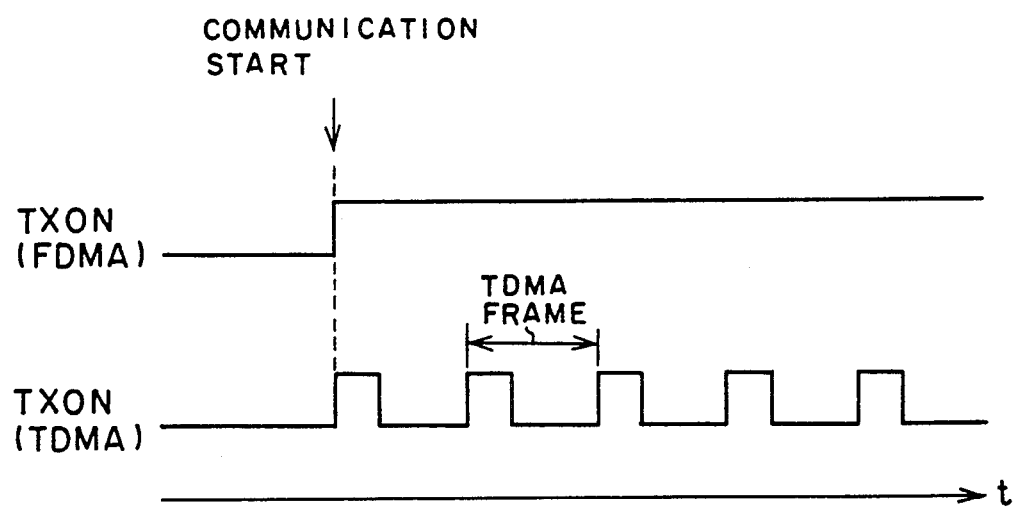
FIG. 4 is a timing chart showing one example of the timing of a TXON.
Figures 5, 6:
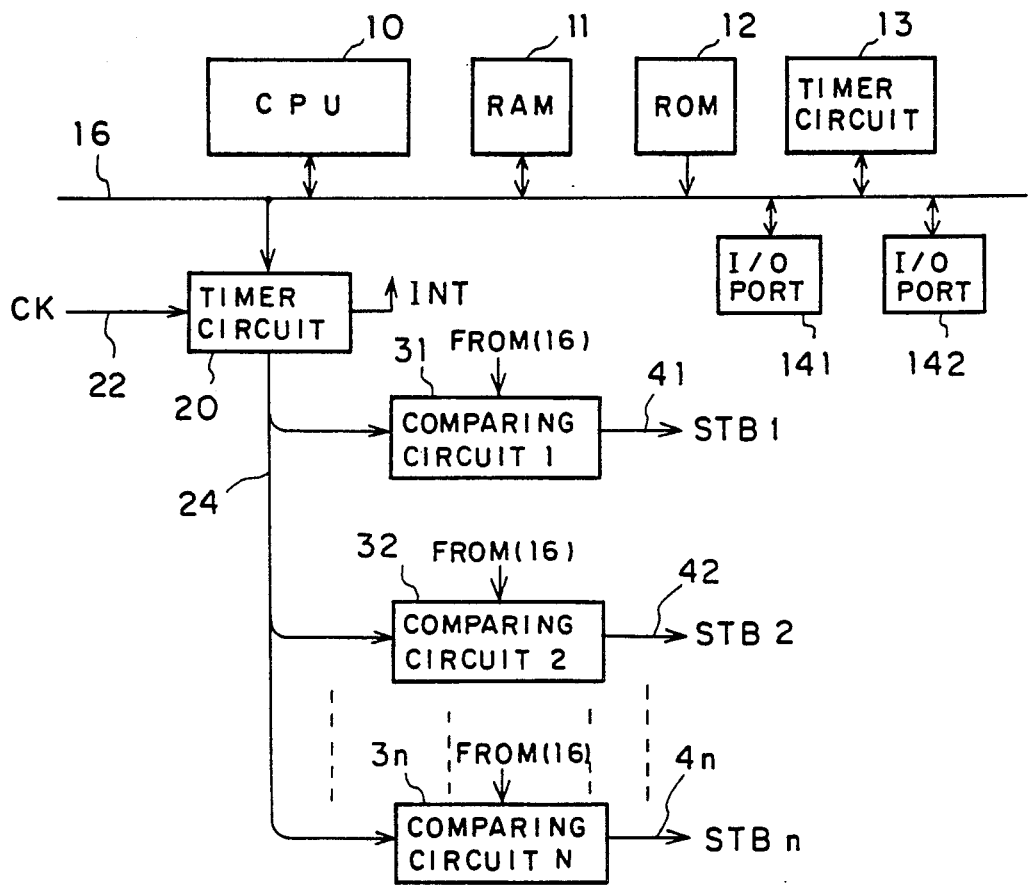
FIG. 5 is a block diagram illustrating a control device according to a first embodiment of the present invention.
FIG. 6 is a timing chart showing the relationship between strobe signals and counted values.

A control device according to one embodiment of the present invention will hereinafter be described with reference to the accompanying drawings. In FIG. 5, there are shown a timer circuit 20 which serves to restore a counted value (value counted by a timer, i.e., timer count value) to an initial value during a period corresponding to a TDMA frame, an input line 22 for a base-band master clock (hereinafter called "master clock"), a supply line 24 for the timer count value, comparing circuits 31 to 3n used to output strobe signals therefrom respectively, and strobe output lines 41 to 4n used to output strobe signal (STB) therefrom respectively. The other components of the control device are denoted by identical reference numerals and identical to those of a conventional control device shown in FIG. 2. However, a program stored in a ROM 12 shown in FIG. 5 is different from that stored in a ROM 12 shown in FIG. 2. Incidentally, the control device according to the present embodiment is provided only with I/O ports 141, 142 each of which pass a signal not required to have the strict timing control. In the present embodiment, a strobe signal generating circuit is structurally realized by the comparing circuits 31 to 3n. A control circuit is constructed so as to be activated in accordance with a program in a CPU 10 and the ROM 12, which is different from a conventional program. Incidentally, it is only necessary to provide one comparing circuit where a strobe signal required for a radio unit may be one.

Figure 7:
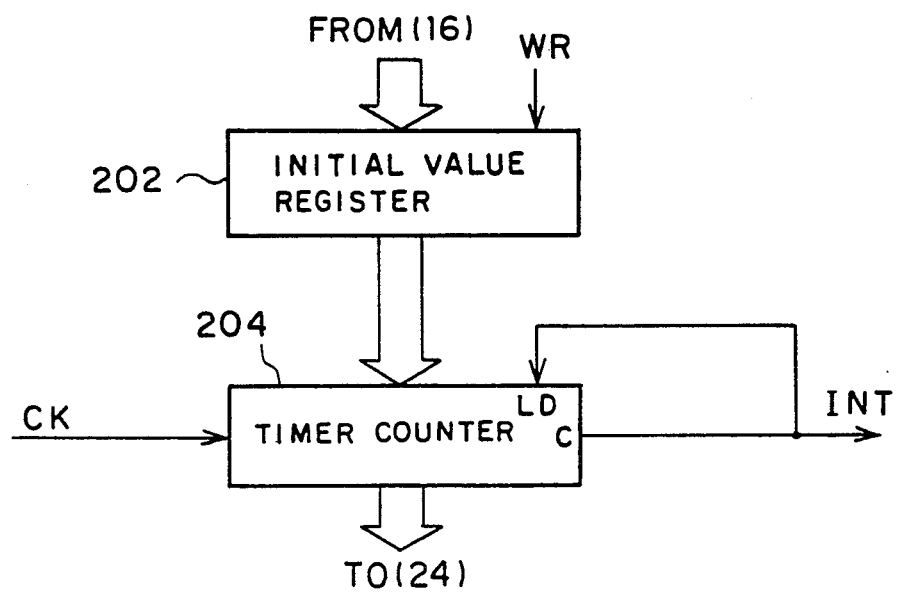
FIG. 7 is a block diagram depicting the structure of a timer circuit.

FIG. 7 is a block diagram showing the structure of one example of the timer circuit 20. In the same drawing, there are shown an initial value register 202 which is connected to a bus 16 and serves to temporarily store an initial value supplied from the CPU 10, and a timer counter 204 which serves to count the number of the master clocks.

Figure 8:
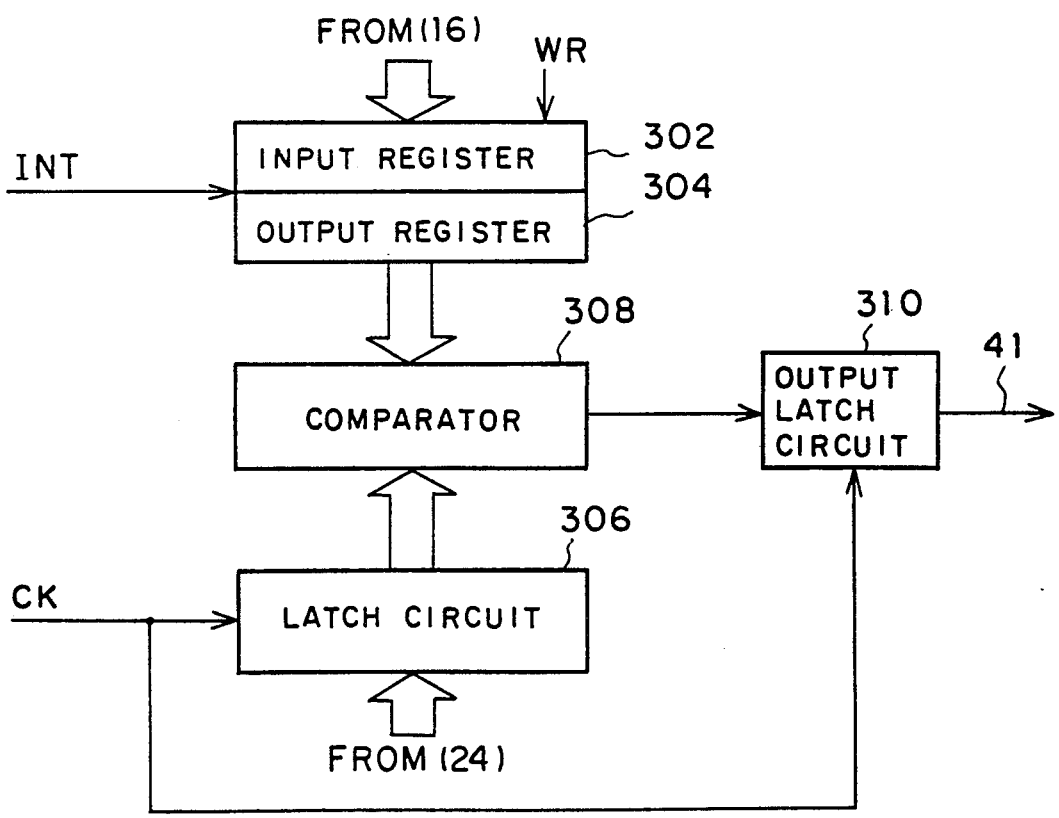
FIG. 8 is a diagram illustrating the structure of a comparing circuit.

FIG. 8 is a block diagram depicting the structure of one example of the comparing circuit 31. In the same drawing, there are shown an input register 302 connected to the bus 16 and supplied with a value set by the CPU 10, an output register 304 for outputting a preset value therefrom, a latch circuit 306 for latching a value counted by the timer counter 204, a comparator 308 for making a comparison between the preset value outputted from the output register 304 and the value stored in the latch circuit 306, and an output latch circuit 310 for synchronizing a coincidence detection pulse outputted from the comparator 308 with the master clock. Incidentally, the remaining comparing circuits 32 to 3n are structurally identical to the comparing circuit 31.

Next, operation of the control device will now be described below. First of all, the CPU 10 initializes in the following manner. Namely, the CPU 10 sets an initial value corresponding to a value obtained by dividing one frame time of a TDMA frame by a period of the master clocks to the initial value register 202 of the timer circuit 20. The CPU 10 also establishes preset values according to various pieces of strobe timing required for the radio unit to the input register 302 of each of the comparing circuits 31 to 3n. Hereafter, the CPU 10 does not participate in the occurrence of strobe signals in the case other than the case where the change in the strobe timing, and the like are required.

The timer counter 204 of the timer circuit 20 counts the number of the master clocks so as to count up, thereby generating a carry signal. Then, the initial value stored in the initial value register 202 is loaded into the timer counter 204 based on the carry signal. Hereafter, the timer counter 204 is repeatedly activated in such a manner that it starts counting from the initial value so as to count up, thereby generating the carry signal. The period for the generation of the carry signal is therefore equal to the period of the TDMA frame. In other words, in this case, the initial value corresponds to a value set such that the difference between the initial value and the counted-up value becomes a value obtained by dividing one frame time of the TDMA frame by the period of the master clocks. The carry signal also corresponds to a frame interrupt signal (INT) relative to the CPU 10.

Each value counted by the timer counter 204 is outputted to the supply line 24 at all times. Thus, such a counted value is supplied to each of the comparing circuits 31 to 3n. In each of the comparing circuits 31 to 3n, the present value in the input register 302 is delivered to the output register 304 in accordance with the frame interrupt signal. Therefore, the comparator 308 can compare the present value and the counted value stored in the latch circuit 306. Then, the comparator 308 outputs a coincidence detection signal when they coincide with each other. The output latch circuit 310 latches the coincidence detection signal in response to the master clocks. Then, the output latch circuit 310 supplies an output thereof as a strobe signal to the radio unit. FIG. 6 shows the relationship between the counted value and the strobe signal at the time that "3" is set to the comparing circuit 31 and "10" is set to the comparing circuit 32. The strobe signal is used for the timing control required for the radio unit. When n comparing circuits 31 to 3n are provided by way of example, n kinds of strobe signals are supplied to the radio unit. As is apparent from the above description, each of the strobe signals is also generated in the same period as that of the TDMA frame.

Figure 9:
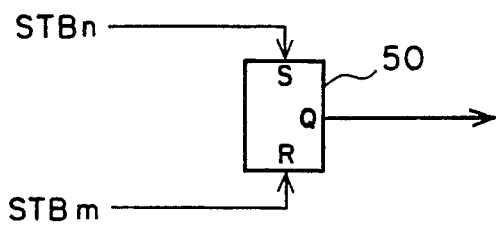
FIG. 9 is a diagram showing a circuit used to change the pulse width of a strobe signal.
Figure 10:
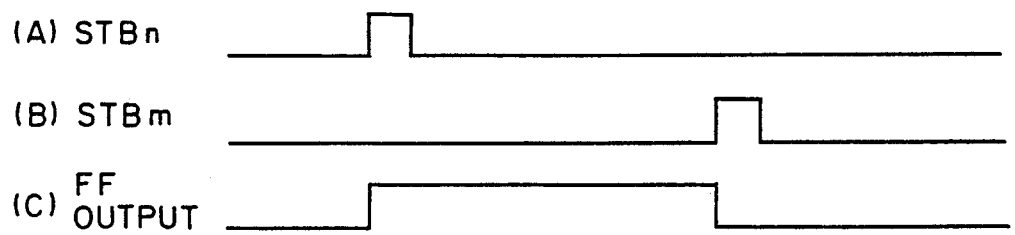
FIG. 10 is a timing chart showing the relationship between strobe signals and an output of a flip-flop.

Incidentally, when it is required to provide a signal of the pulse width longer than that of the strobe signal, a RS flip-flop (FF) 50 may be provided in the following stage of the output latch circuit 310, as shown in FIG. 9. Thus, the signal having widened pulse width such as shown in FIG. 10 can be created. The timing period and pulse width of this signal are set to desired values respectively by controlling the preset values of the comparing circuits 31 to 3n, which correspond to two strobe signals used as inputs to the FF 50.

It is also easy to change the timing for generating each strobe signal. More specifically, when a TDMA frame immediately before a TDMA frame received at the time the change in the timing is required is being received, the CPU 10 may set a changed preset value to the input register 302 of each of the comparing circuits 31 to 3n. If such setting is performed, a new preset value is set to the output register 304 when the following frame interrupt signal is outputted, and hence the timing for generating each strobe signal is changed.

It is also easy to perform the adjustment of or the change in the phase of the TDMA frame, i.e., to shift the timing for generating the frame interrupt signal. In other words, the initial value supplied to the timer circuit 20 is set to a value corresponding to the quantity of the phase which one desires to shift, and the normal initial value may be given again to the timer circuit 20 when the frame interrupt signal is outputted.

Figure 11:
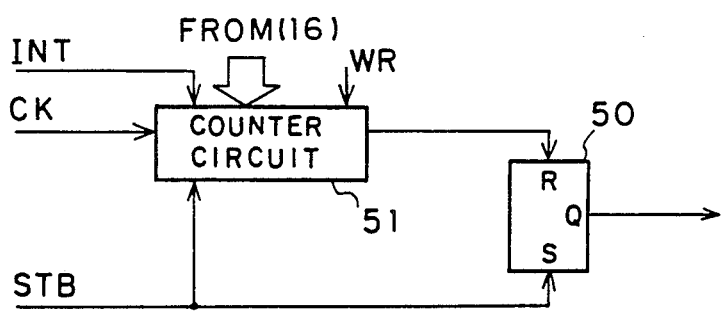
FIG. 11 is diagram depicting another circuit used to change the pulse width of a strobe signal.
Figure 12:
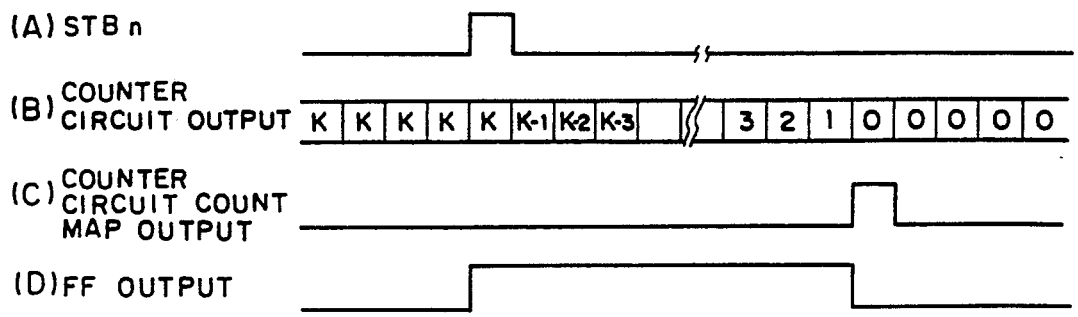
FIG. 12 is a timing chart showing the relationship between an output of a counter circuit and an output of a flip-flop.

Now, a description has been made in the case where the two strobe signals have been used to generate the signal having the long pulse width. However, a counter circuit 51 may be used for the same purpose as referred to above. As shown in FIG. 11 by way of example, the CPU 11 sets count values K each corresponding to the pulse width to the counter circuit 51. As shown in FIG. 12, the CPU 11 starts to count down taking a strobe signal n as the trigger, and resets the FF 50 in response to a borrow signal. Thus, the signal having the pulse width corresponding to each count down taking a strobe signal n as the trigger, and resets the FF 50 in response to a borrow signal. Thus, the signal having the pulse width corresponding to each count value K is produced. Incidentally, each count value K is stored inside the counter circuit 51 and loaded into a counting portion of the counter circuit 51 based on the frame interrupt signal.

Figure 13:
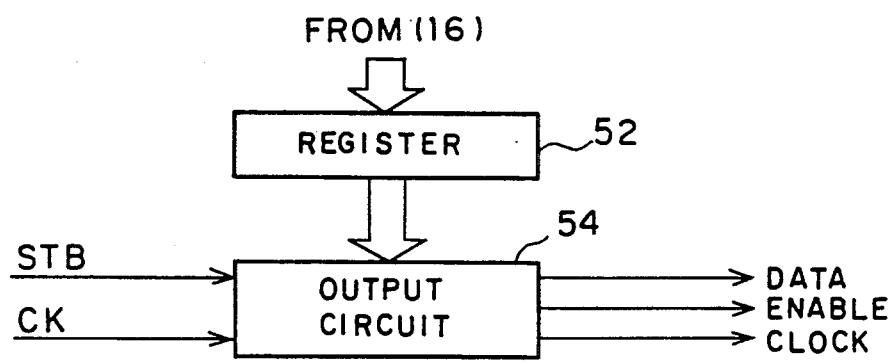
FIG. 13 is a diagram illustrating the structure of a circuit used to output serial data therefrom.

When it is required to transmit serial data as in the case of setting up the frequency with respect to a frequency synthesizer in the radio unit, a register 52 in which data are to be set in advance and an output circuit 54 shown in FIG. 13 may be provided in a stage after the output latch circuit 310. In this case, the CPU 10 sets prescribed data to the register 52, and the output circuit 54 receives data from the register 52 taking the strobe signal as the trigger and then outputs the prescribed data as serial data in synchronism with the master clocks. In addition, the output circuit 54 serves to make an enable signal active while the serial data is being outputted. Thus, desired serial data can be outputted to the radio unit. Further, the provision of such two circuits, i.e., the register 52 and the output circuit 54 makes it easy to monitor other channels other than channels within the TDMA frame itself.

Figure 14:
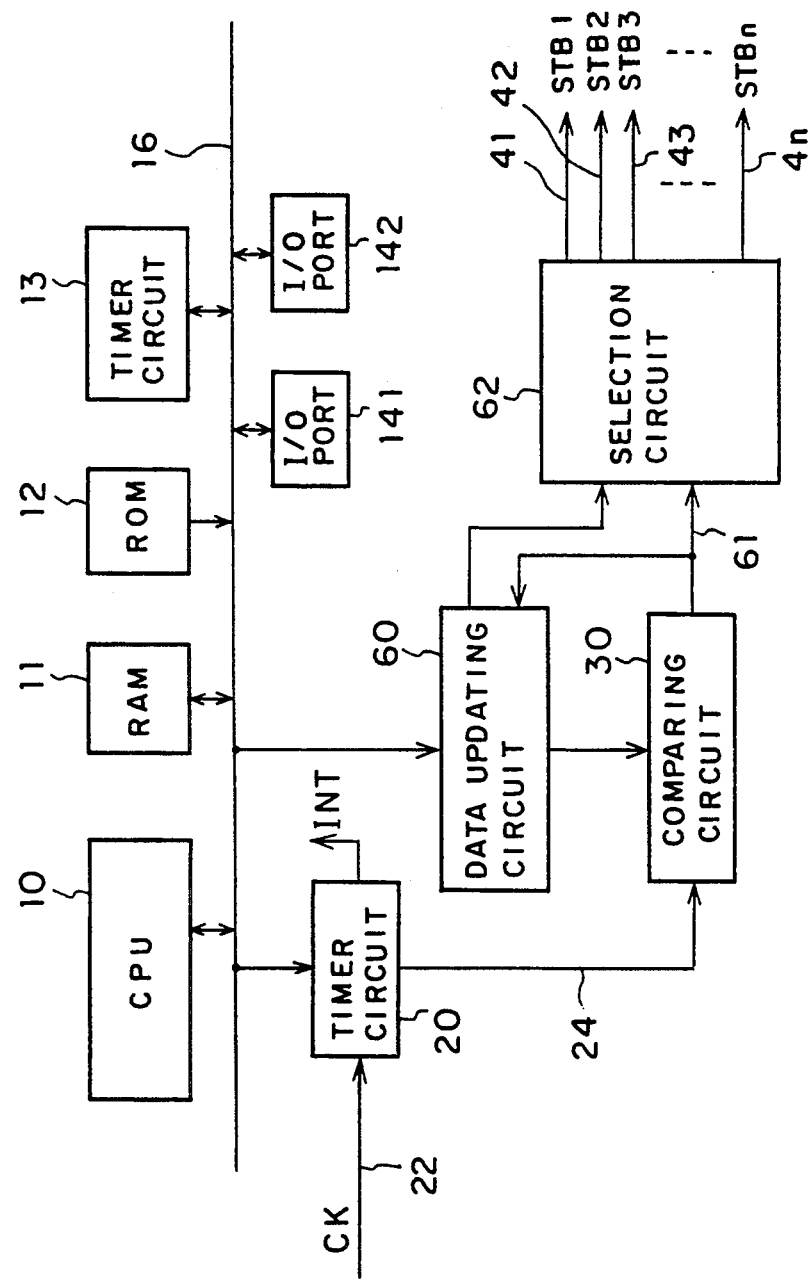
FIG. 14 is a block diagram showing a control device according to a second embodiment of the present invention.

FIG. 14 is a block diagram showing a control device according to a second embodiment of this invention. In the same drawing, there are shown a comparing circuit 30 for comparing a counted value and a preset value, a data updating circuit 60 which enables to bring a plurality of preset values up to data, and a selection circuit 62 adapted to output strobe signals to predetermined strobe output lines 41 to 4n, respectively. In this case, a strobe signal generating circuit comprises the comparing circuit 30, the data updating circuit 60 and the selection circuit 62. Incidentally, designated at numeral 61 is a coincidence detection pulse outputted from the comparing circuit 30.

Figure 15:
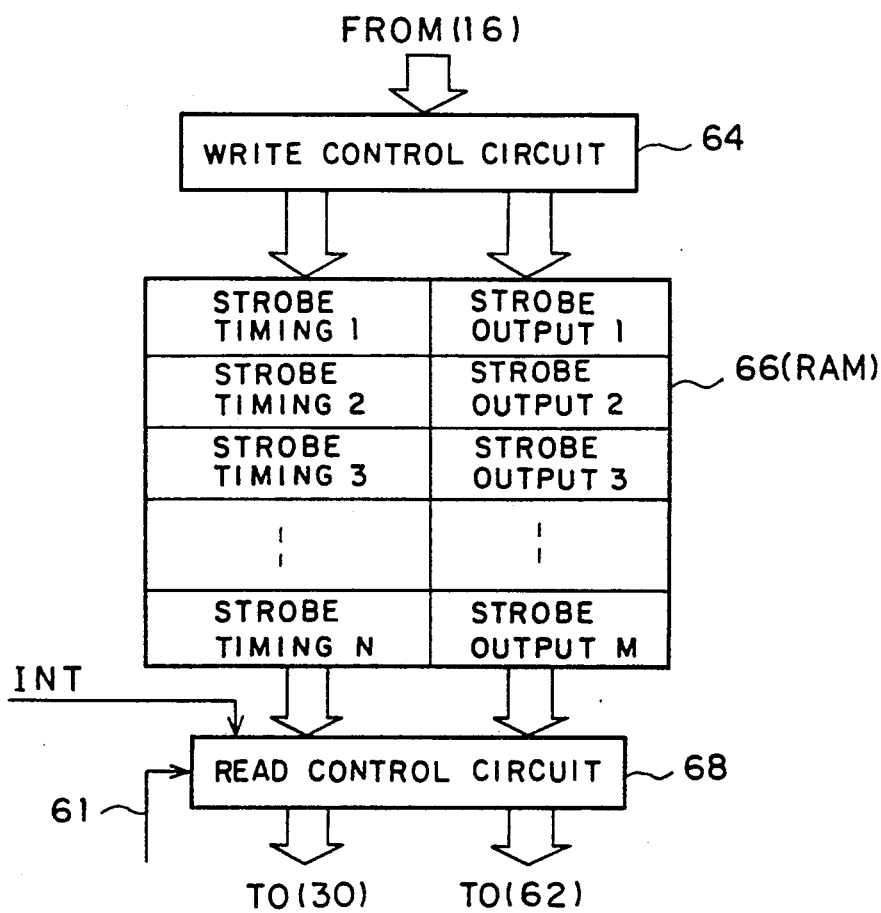
FIG. 15 is a diagram depicting the structure of a data updating circuit.

FIG. 15 is a diagram showing one example of the structure of the data updating circuit 60. In the same drawing, designated at numeral 64 is a write control circuit connected to the bus 16 and for receiving necessary data from the CPU 10 to write the same into a RAM 66, and numeral 68 indicates a read control circuit for applying necessary data to the comparing circuit 30 and the selection circuit 62 in response to the coincidence detection pulse 61.

Next, operation of the control device will now be described. Upon establishing an initial condition, the CPU 10 supplies preset values used to produce the timing for generating a necessary strobe signal and information representing the output destination of strobe signals corresponding to these preset values to the data updating circuit 60 in order of the strobe-signal generating timing. As a consequence, the write control circuit 64 writes the preset values and the information indicative of the output destination of the strobe signals into the RAM 66. The comparing circuit 30 is constructed as shown in FIG. 8 by way of example. However, the preset values in the input register 302 are immediately transferred to the output register 304 in this case. The read control circuit 68 supplies a first preset value to the comparing circuit 30 in response to the frame interrupt signal, and also supplies first information to the selection circuit 62. As a consequence, the comparing circuit 30 compares the first preset value and the value counted by the timer circuit 20, and then outputs the coincidence detection pulse 61 to the selection circuit 62 and the read control circuit 68 when the first value and the counted value coincide with each other. The selection circuit 62 selects any one of the strobe signal output lines 41 to 4n, which is indicative of the first information, and then outputs a strobe signal to the selected one of the strobe signal output lines 41 to 4n. On the other hand, the read control circuit 68 supplies the following preset value to the comparing circuit 30 in response to the coincidence detection pulse 61, and gives information corresponding to that preset value to the selection circuit 62. Hereafter, this operation is repeatedly performed, so that a necessary number of strobe signals are outputted from the selection circuit 62. The period of each strobe signal corresponds to that of the TDMA frame.

Incidentally, the above-described embodiments have shown and described a mobile station. However, the embodiments described above can also be applied to a base station by fixing a setting in a transmit-receive periodic counter and providing strobe signal generating circuits by the number corresponding to a plurality of channels.

Figure 16:
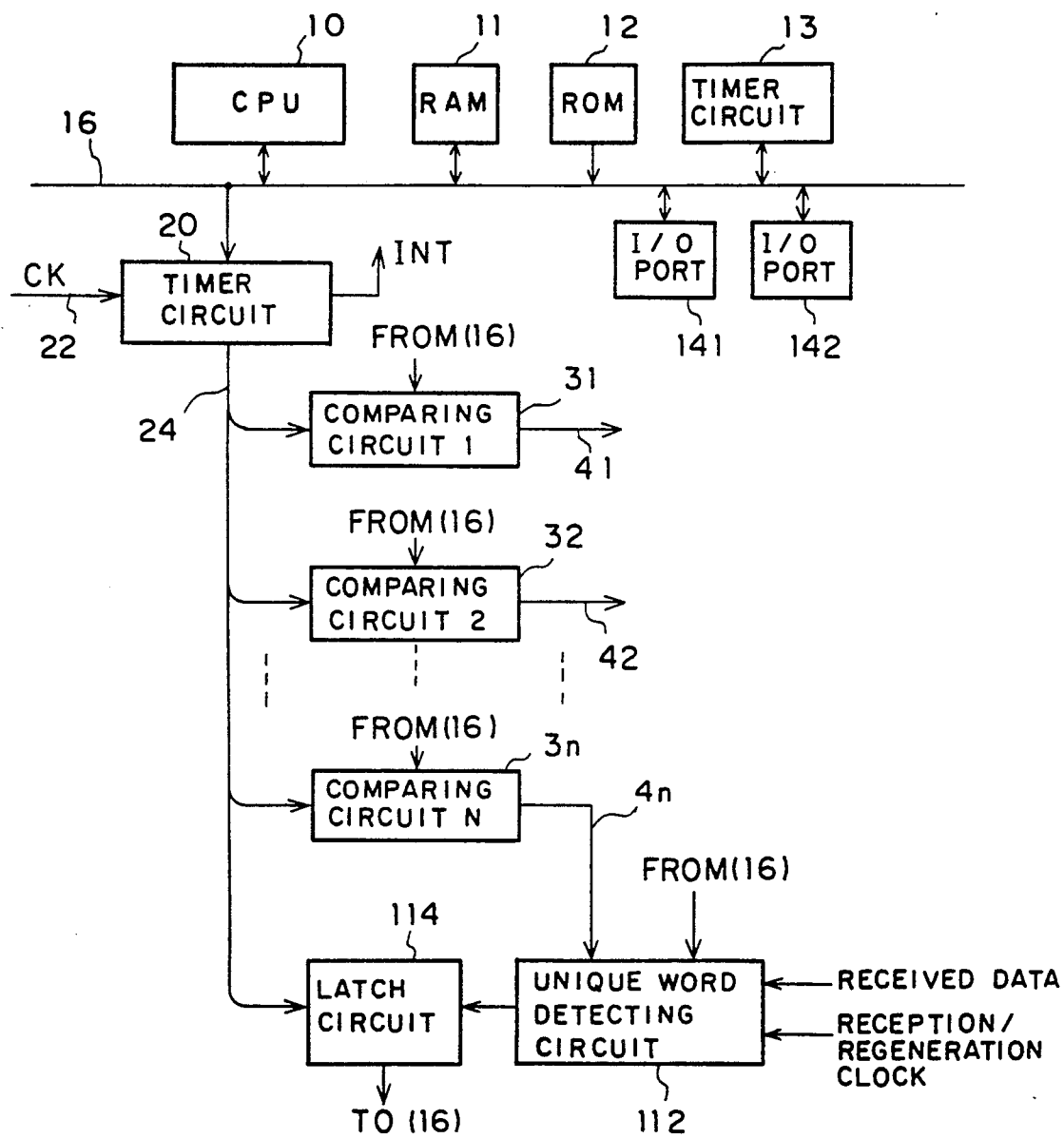
FIG. 16 is a block diagram showing a control device according to a third embodiment of the present invention.

When the mobile station is moved at high speed, the synchronous shift in the receiving timing takes place. However, the synchronous shift can be corrected by providing a circuit for detecting the receiving timing, which is shown in FIG. 16. A control device shown in FIG. 16 according to a third embodiment is additionally provided with a unique word detecting circuit 112 and a latch circuit 114. The unique word detecting circuit 112 is supplied with a desired one of strobe signals. The desired one strobe signal is equivalent to a signal indicative of a reference timing signal at that time. First of all, the unique word detecting circuit 112 starts its operation based on a detection command from the CPU 10. Then, the unique word detecting circuit 112 detects a unique word based on received data and a reception/regeneration clock in response to the reference timing signal. The unique word detecting circuit 112 outputs a detection pulse when the unique word is detected. This detection pulse is given to the latch circuit 114 supplied with the value counted by the timer circuit 20. The latch circuit 114 latches the counted value introduced from the timer circuit 20 in response to the detection pulse. Then, the CPU 10 reads out the value stored in the latch circuit 114. As a consequence, the receiving synchronous timing for each TDMA frame can be detected from the value thus read. The CPU 10 performs the moving average processing or the like based on the receiving synchronous timing of each TDMA frame, thereby making it possible to detect the synchronous shift in the receiving timing. The CPU 10 sets a value corresponding to the quantity of the shift thus detected to the timer circuit 20, and thereafter resets the initial value, thereby making it possible to correct the receiving timing.

Figure 17:
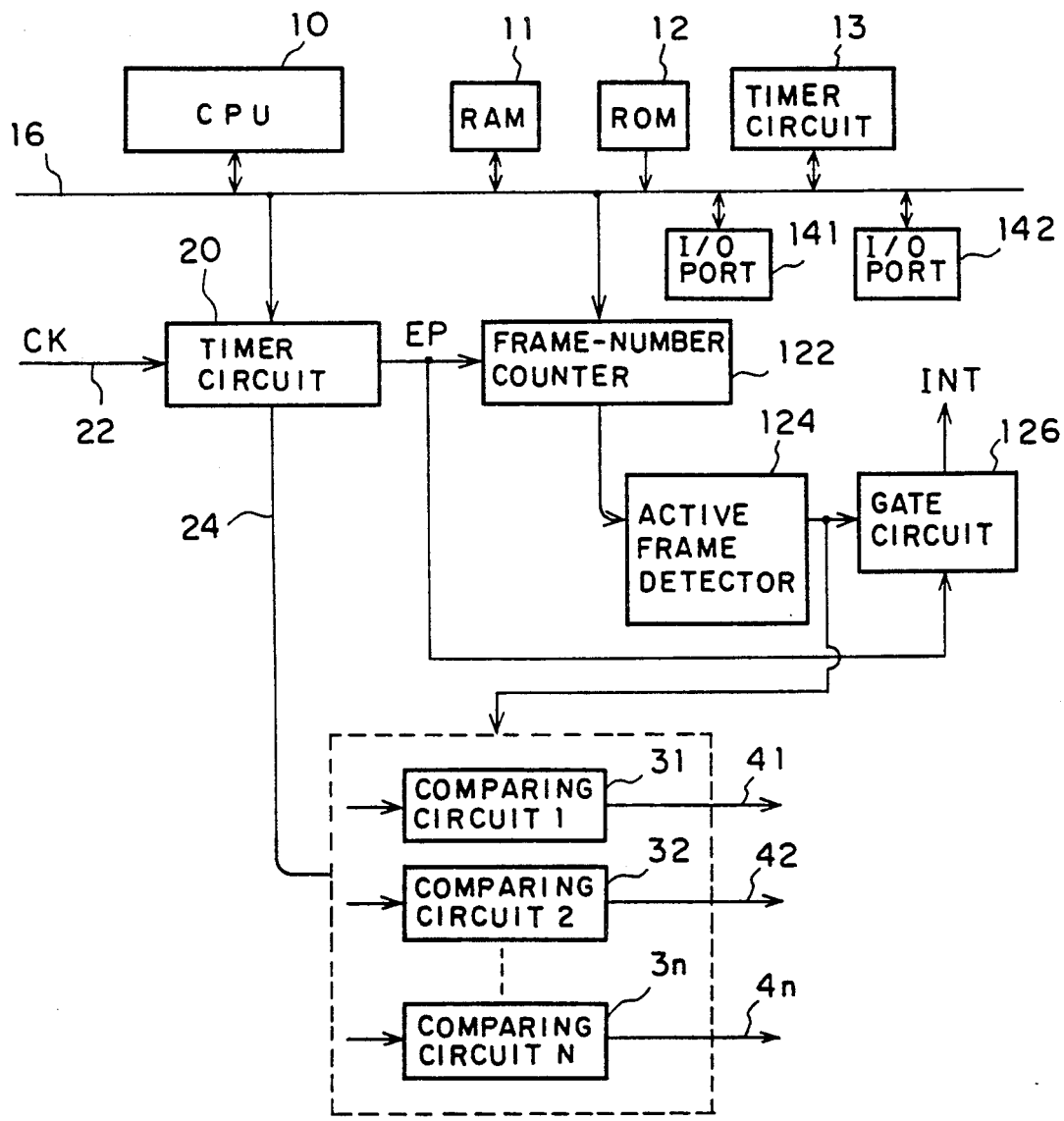
FIG. 17 is a block diagram illustrating a control device according to a fourth embodiment of the present invention.
Figure 18:
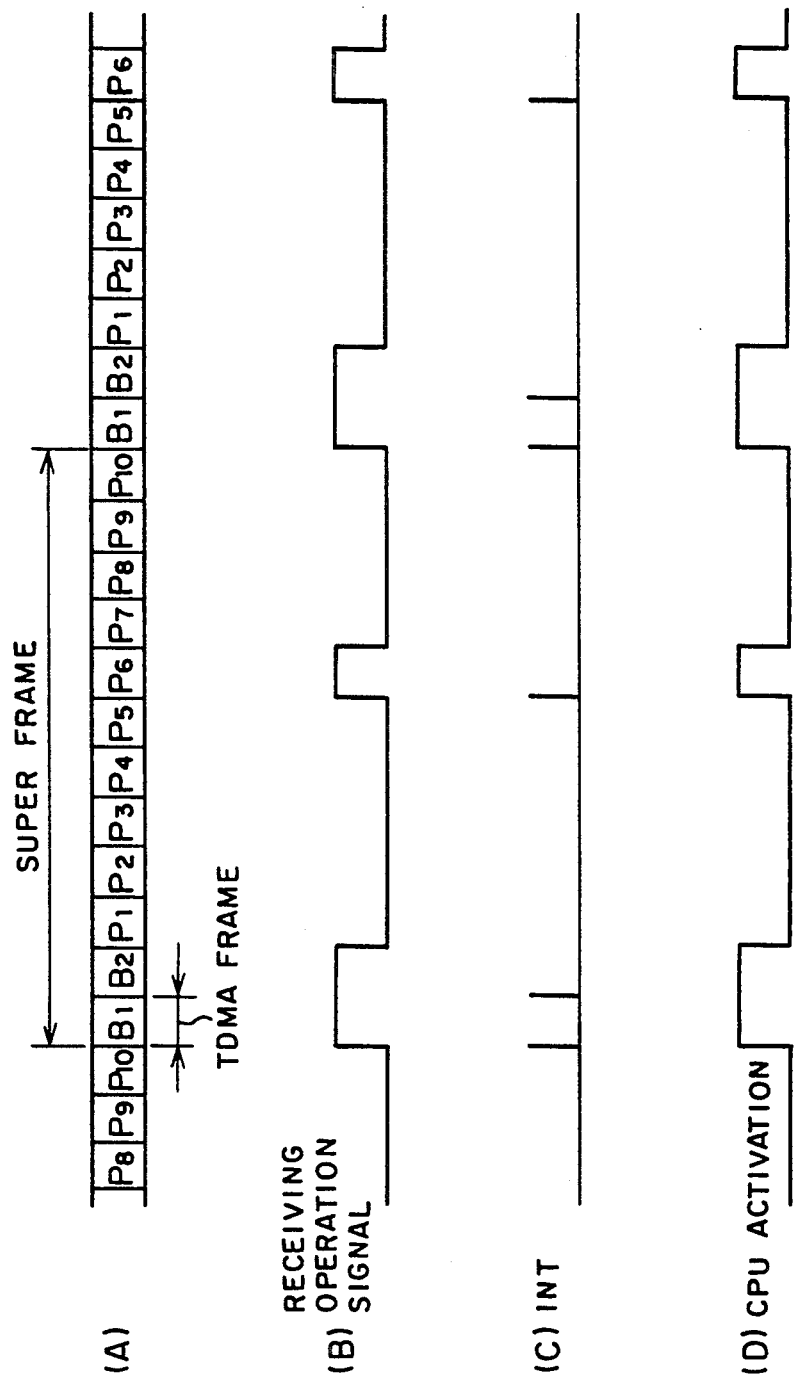
FIG. 18 is a timing chart showing the relationship between a transmission start signal and an operation signal of a CPU.

In the control device employed in each of the above-described embodiments, a request for the frame interrupt for each TDMA frame is made to the CPU 10 even in the case of the intermittent receiving operation. It is therefore necessary to activate the CPU 10 even when the receiving processing is unnecessary, and hence excess power consumption is made. A control device shown in FIG. 17 according to a fourth embodiment can overcome the problem referred to above. In this case, the control device is provided with a frame-number counter 122 for counting the number of received TDMA frames, an active frame detector 124 and a gate circuit 126. More specifically, a carry signal outputted from the timer circuit 20 is not used as a frame interrupt signal but used as a frame pulse (FP), and this frame pulse is then inputted to the frame-number counter 122. The frame-number counter 122 is a counter of such a type that the number of TDMA frames representing a super frame is set equal to one complete cycle. For example, when the super frame is composed of twelve TDMA frames, the count values circulate among "0" to "11". The active frame detector 124 is informed of data indicative of TDMA frame's numbers to be received, by the CPU 10 in advance. Thus, the active frame detector 124 compares a value counted by the frame-number counter 122 with data indicative of a set number, and outputs a receiving start signal while they coincide with each other. The receiving start signal is used as a gate signal for the gate circuit 126. The gate circuit 126 serves to output a frame pulse as the frame interrupt signal to the CPU 10 only during the period in which the receiving start signal is being rendered active. FIG. 18 shows the manner in which respective signals are produced at the time that three TDMA frames in the super frame are intermittently received. If the frame interrupt signal is generated only when the receiving operation is required, the CPU 10 can be brought into an inactivated state and the power consumption of the control device can be rendered low when the receiving operation is not required.

Figure 19:
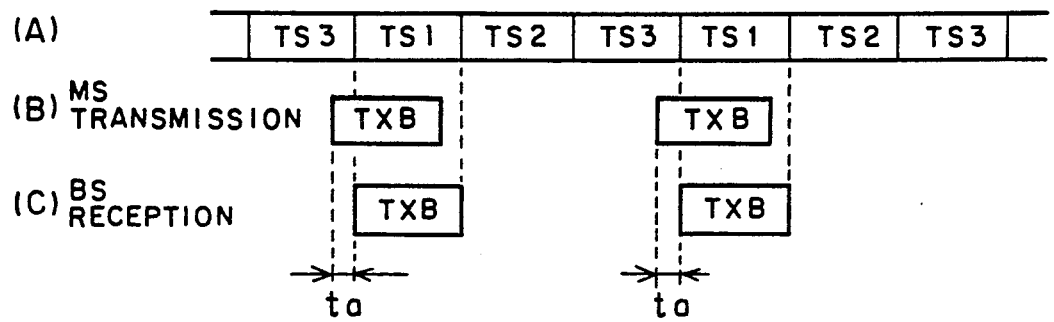
FIG. 19 is a timing chart for describing the propagation delay time.

Meanwhile, the propagation delay time ta occurs in the transfer of a signal between the base station and the mobile station as shown in FIG. 19. When the communication between the base and mobile stations is performed in the form of a TDMA system, it is necessary to compensate for the propagation delay time ta and output a transmission signal from the mobile station.

Figure 20:
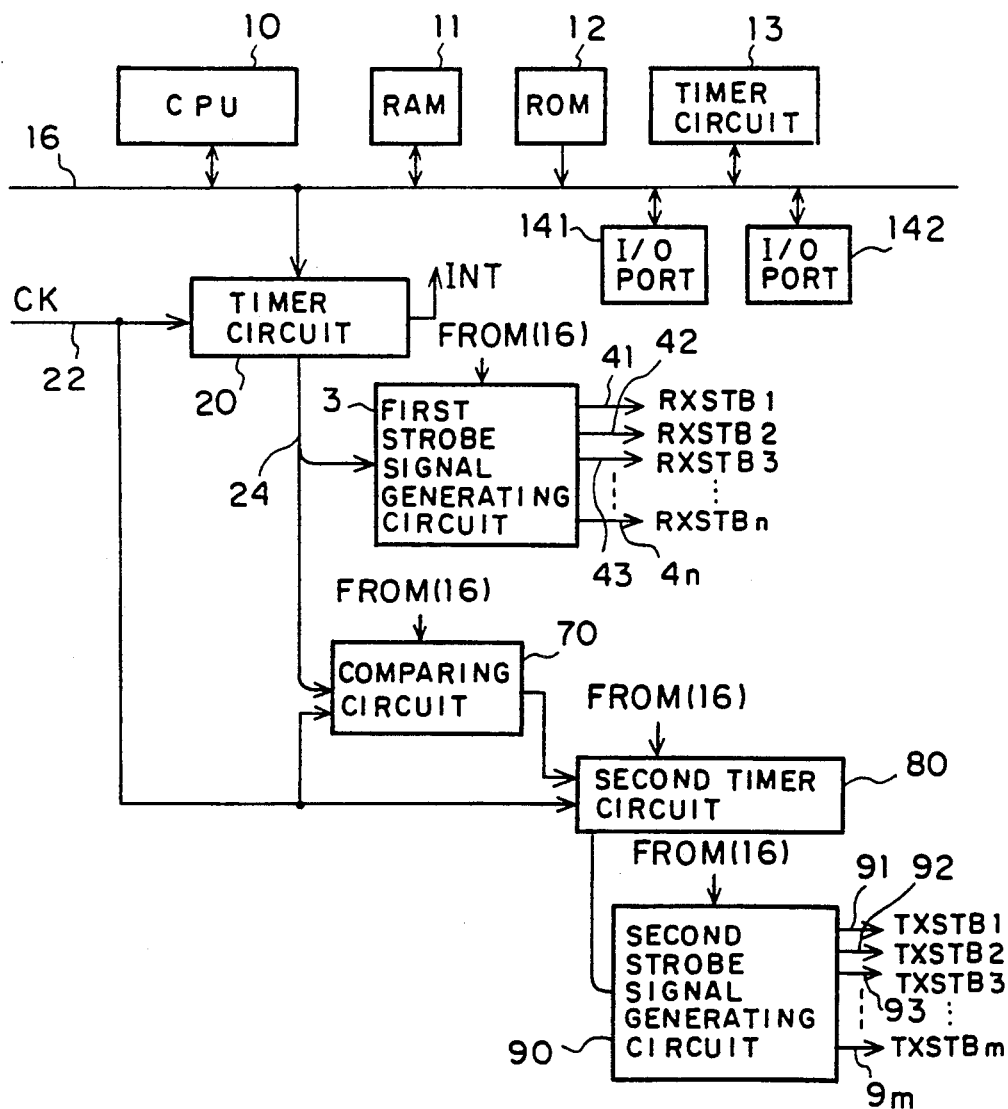
FIG. 20 is a block diagram showing a control device according to a fifth embodiment of the present invention.

FIG. 20 is a block diagram showing a control device according to a fifth embodiment of the present invention, which can compensate for the propagation delay time. In the same drawing, there are shown a first strobe signal generating circuit 3 for generating a strobe signal (RXSTB) to be supplied to a radio receiving unit, a comparing circuit 70 for comparing a timing correction value supplied from the CPU 10 and a value counted by a timer circuit (first timer circuit) 20, a second timer circuit 80 for making a start in the counting of the number of master clocks in synchronism with a trigger signal, and a second strobe signal generating circuit 90 for generating a strobe signal (TXSTB) to be supplied to a radio transmitting unit. Designated at numerals 91 to 9m are strobe-signal output lines connected to the radio transmitting unit. Incidentally, the strobe signal generating circuit (corresponding to one shown in FIG. 5 or FIG. 14) employed in the first embodiment or the second embodiment can be adopted in structure as each of the first strobe signal generating circuit 3 and the second strobe signal generating circuit 90 as it is.

Figure 21:
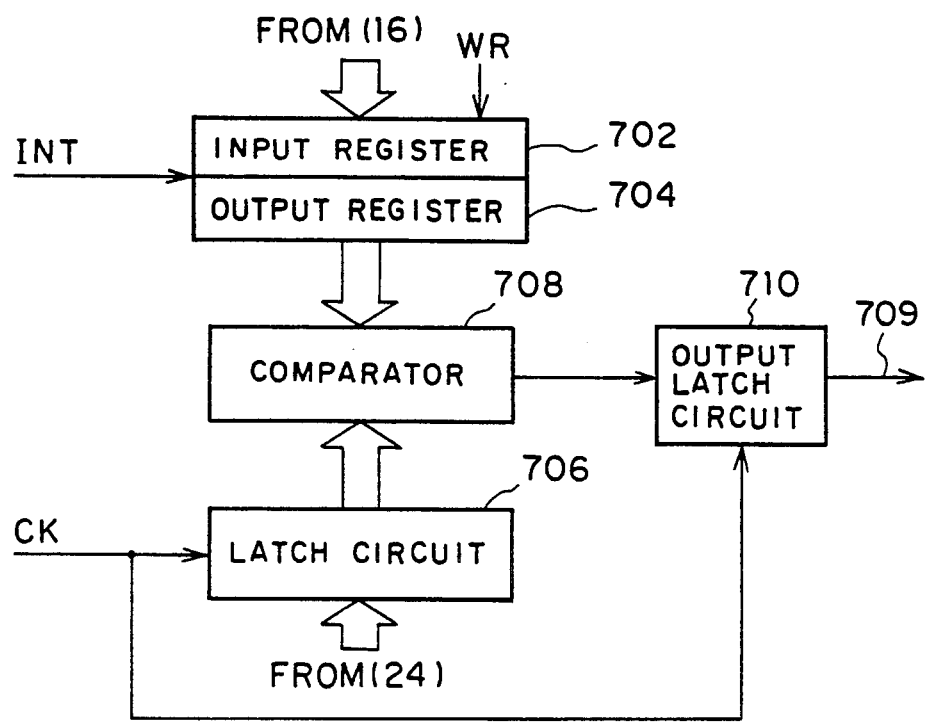
FIG. 21 is a block diagram depicting the structure of a comparing circuit.

FIG. 21 is a block diagram showing one example of the structure of the comparing circuit 70. In the same drawing, there are shown an input register 702 connected to the bus 16 and in which the timing correction value is set by the CPU 10, an output register 704 for outputting the timing correction value therefrom, a latch circuit 706 for latching the value counted by the timer circuit 20, a comparator 708 for comparing the timing correction value outputted from the output register 704 and the value stored in the latch circuit 706, and an output latch circuit 710 for synchronizing a trigger signal outputted from the comparator 708 with the master clock. Incidentally, designated at numeral 709 is a trigger signal supplied to the second timer circuit 80.

Figure 22:
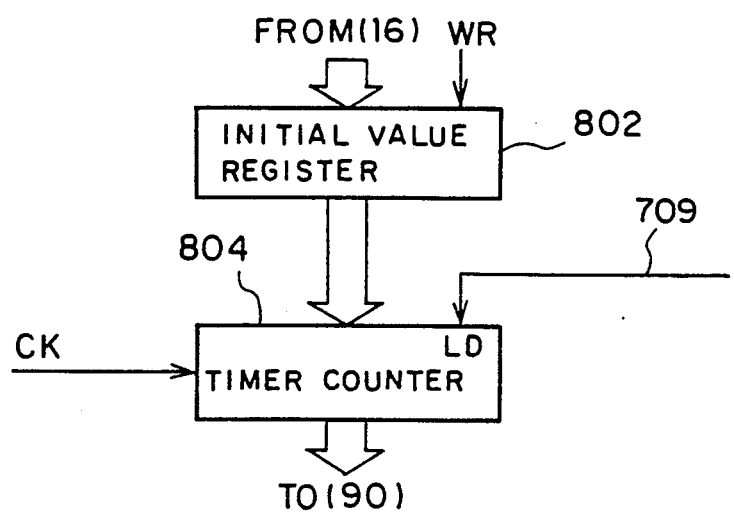
FIG. 22 is a block diagram showing the structure of a second timer circuit.

FIG. 22 is a block diagram showing one example of the structure of the second timer circuit 80. In the same drawing, there are shown an initial value register 802 connected to the bus 16 and for temporarily storing an initial value supplied from the CPU 10, and a timer counter 804 for counting the number of the master clocks.

Figure 23:
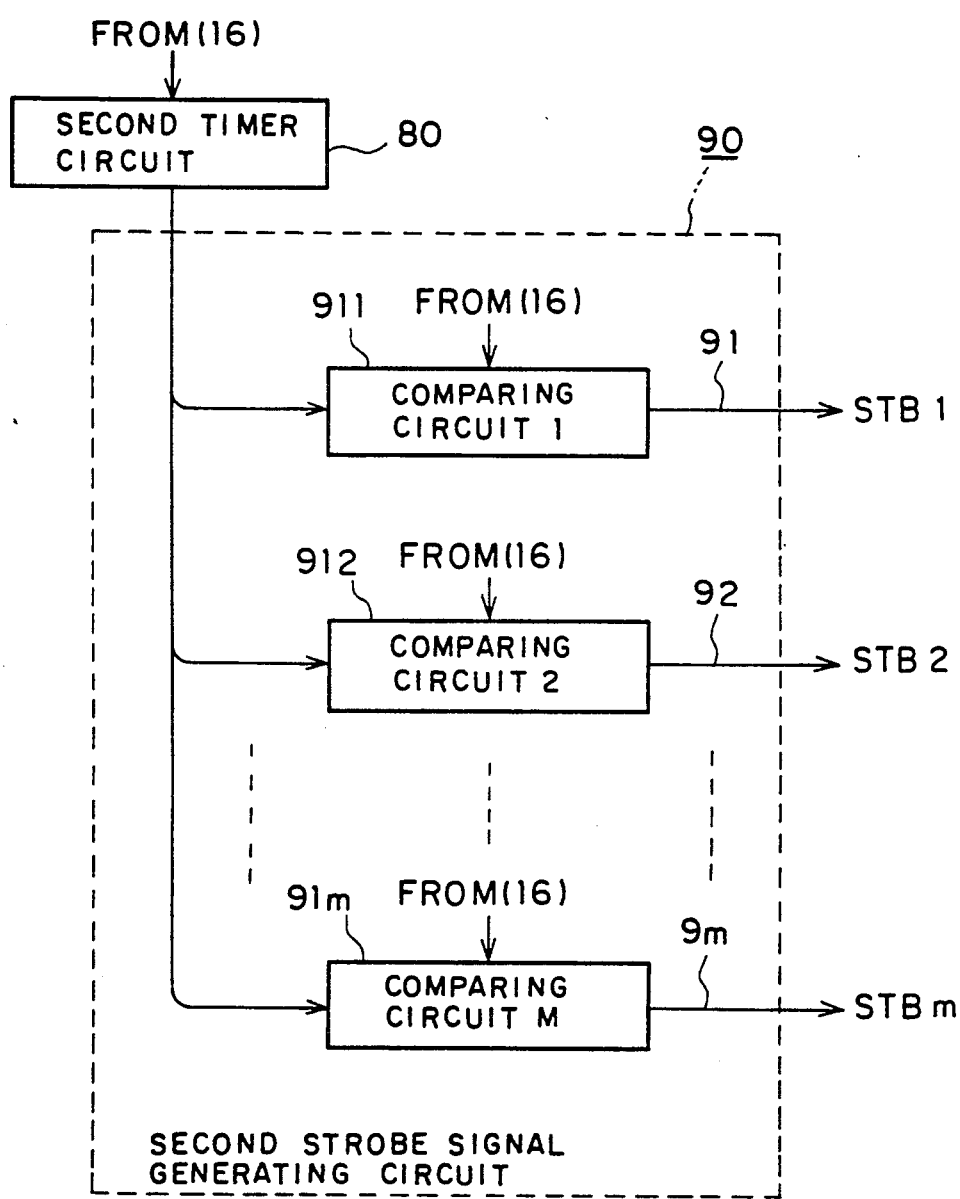
FIG. 23 is a block diagram depicting the structure of a second strobe circuit.

Next, operations of the circuits other than the timer circuit 20 and the first strobe signal generating circuit 3 will now be described. The operation of each of both the timer circuit 20 and the first strobe signal generating circuit 3 is identical to that of each of those employed in the first and second embodiments, and its description will therefore be omitted. In this case, the CPU 10 sets the comparing circuit 70, the second timer circuit 80 and the second strobe signal generating circuit 90 to their associated initial values upon establishing an initial condition. More specifically, a timing correction value created based on the amount of correction of the transmission timing designated by the base station is given to the comparing circuit 70. An initial value of, for example, "0000" is applied to the second timer circuit 80, and respective preset values (respective preset values for transmission) for generating respective strobe signals are supplied to the second strobe signal generating circuit 90. When the structure of the strobe signal generating circuit shown in FIG. 5 is adopted as that of the second strobe signal generating circuit 90, the second strobe signal generating circuit 90 is constructed as shown in FIG. 23. Thus, the respective circuits 911 to 91m are structurally identical to those illustrated in FIG. 8. In addition, the respective preset values are given to the respective comparing circuits 911 to 91m. Incidentally, one comparing circuit may be provided where only one strobe signal is required.

In the comparing circuit 70, the timing correction value set in the input register 702 is transferred to the output register 704 based on the frame interrupt signal. As a consequence, the comparator 708 compares the timing correction value and the counted value of the first timer circuit 20, which is stored in the latch circuit 706. When they coincide with each other, the comparator 708 outputs a trigger signal through the output latch circuit 710. Accordingly, the timing correction value set by the CPU 10 is a value set in such a manner that (timing correction value − initial value of the first timer circuit 20)×(period of the master clock) becomes a correction value for the transmission timing. In the second timer circuit 80, the timer counter 804 takes in or receives a value stored in the initial value register 802 in response to the trigger signal so as to start counting. When the initial value is "0000", the timer counter 804 counts up from "0000". The counted value thereof is outputted to the second strobe signal generating circuit 90. Hereafter, the comparing circuit 70 outputs a trigger signal in the same period as that of the TDMA frame, and the counted value of the second timer circuit 80 is restored to "0000" according to the trigger signal. Incidentally, the comparing circuit 70 outputs a trigger signal only one time after the timing correction value is set by the CPU 10. The second timer circuit 80 is triggered by the trigger signal. Hereafter, the second timer circuit 80 itself may reload the initial value in the same manner as the first timer circuit 20.

Then, the respective comparing circuits 911 to 91m of the second strobe signal generating 90 each compare a value counted by the second timer circuit 80 and each of the preset values. When they coincide with each other, each of the comparing circuits 911 to 91m outputs a strobe signal. The strobe signal thus outputted is supplied to the radio transmitting unit. The radio transmitting unit performs timing control according to the so-supplied strobe signal. Thus, the radio transmitting unit can carry out the transmission control in the corrected transmission timing.

When information about a change in the amount of correction of the transmission timing is transferred from the base station to the mobile station when in communication, the CPU 10 serves to set the changed timing correction value to the input register 702 of the comparing circuit 70 while a frame immediately before a TDMA frame required to be changed is being received. As a consequence, a new timing correction value is transferred to the output register 704 based on the following interrupt signal. It is therefore possible to carry out the transmission control in the new correction timing from the following TDMA frame. Even in this case, the circuits shown in FIG. 9 and 11 or one depicted in FIG. 13 may be provided at a stage after the second strobe signal generating circuit 90 so as to electrically process a strobe signal.

Figure 24:
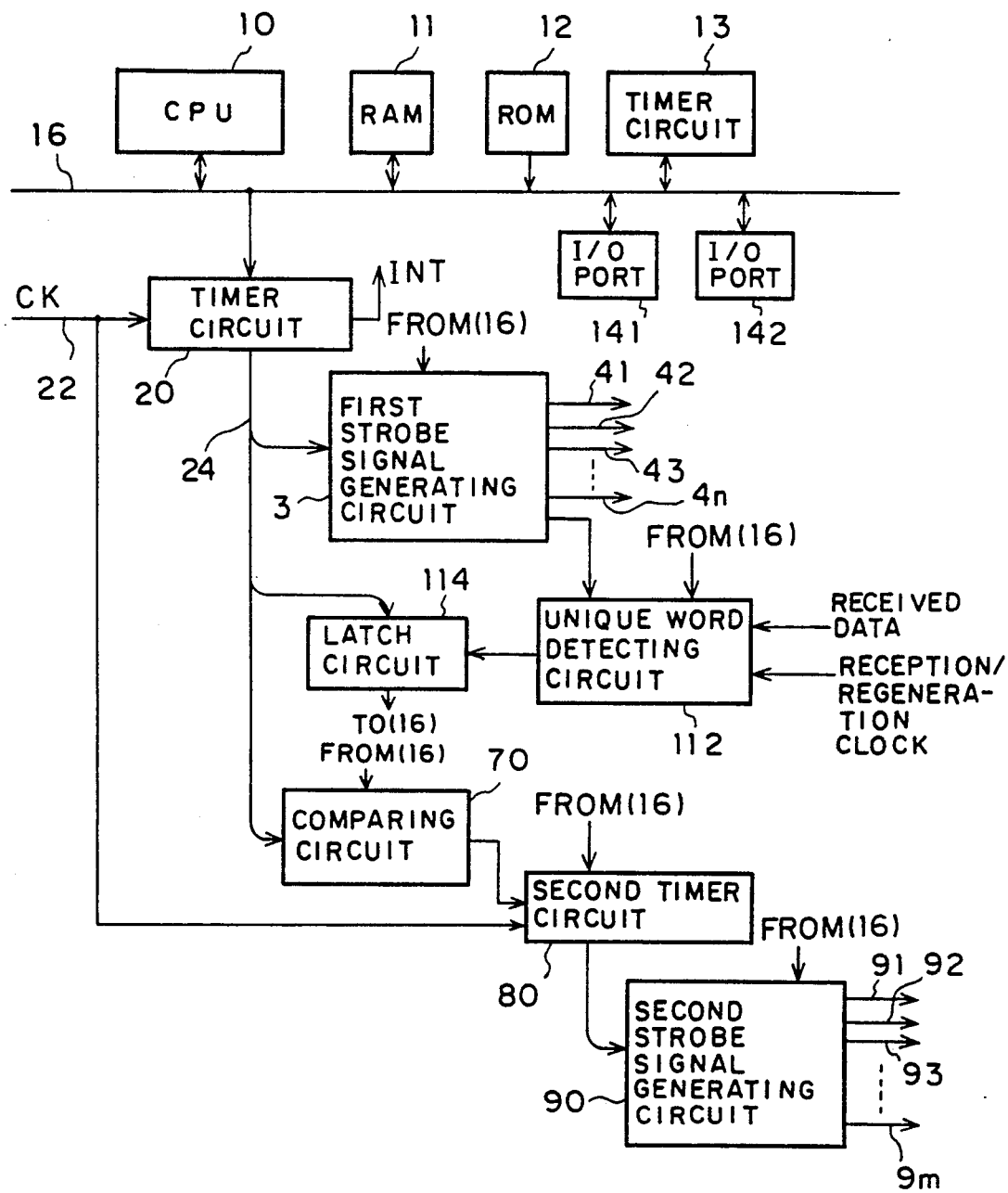
FIG. 24 is a block diagram showing a control device according to a sixth embodiment of the present invention.

Incidentally, when the mobile station is in motion at high speed, a synchronous shift occurs in the receiving timing. However, a circuit shown in FIG. 24 for detecting the receiving timing may be added so as to correct such a shift. The operation for effecting the correction of the shift is the same as that in the third embodiment shown in FIG. 16, and its description will therefore be omitted.

Figure 25:
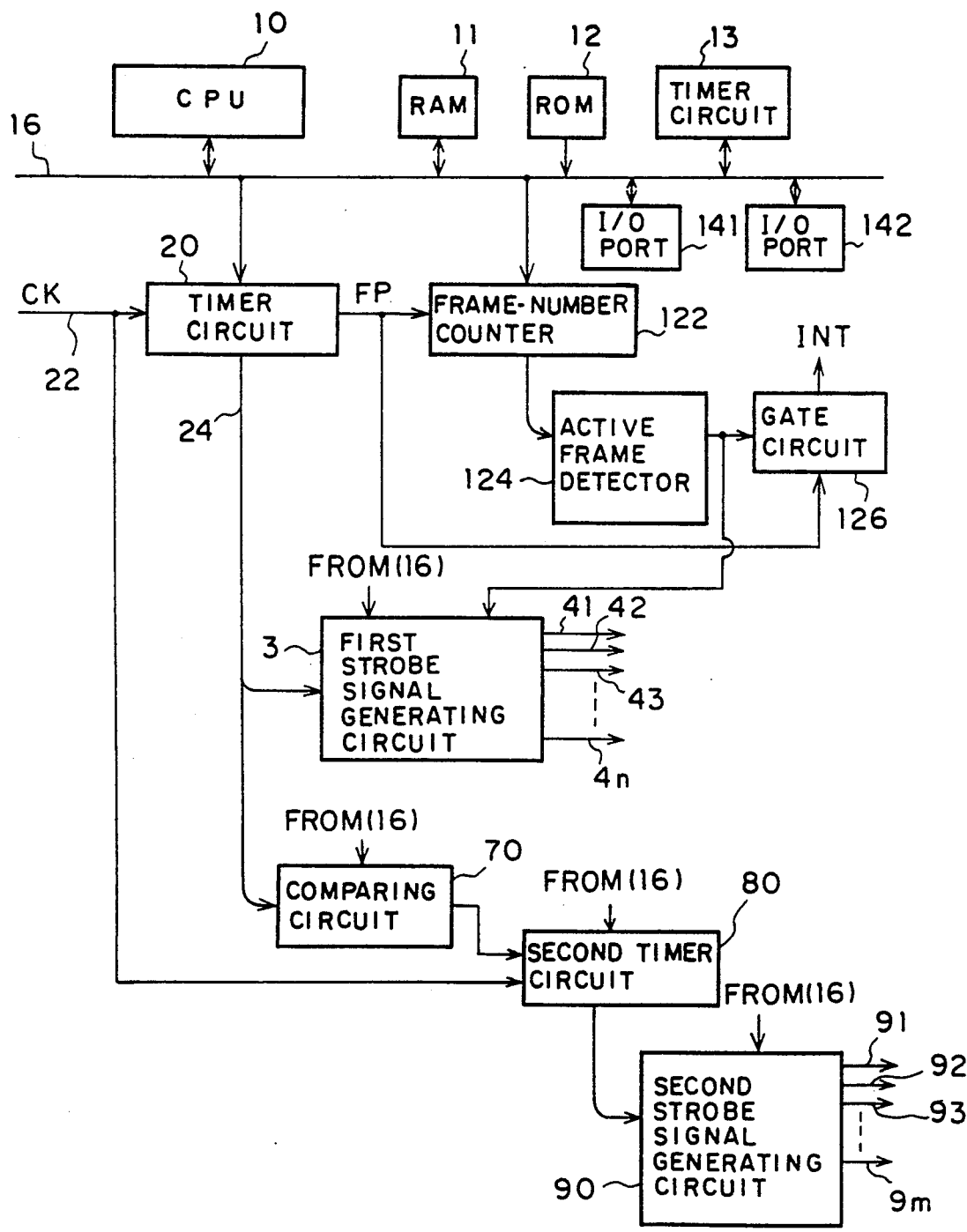
FIG. 25 is a block diagram illustrating a control device according to a seventh embodiment of the present invention.

If a frame-number counter 122, an active frame detector 124 and a gate circuit 126 are added as shown in FIG. 25, no frame interrupt signal is produced when a TDMA frame in the supper frame not required to be received is inputted, thus making it possible to activate the CPU 10 intermittently. The operation of each of the frame-number counter 122, the active frame detector 124 and the gate circuit 126 is identical to that of those employed in the fourth embodiment, and its description will therefore be omitted.

Having now fully described the invention, it will be apparent to those skilled in the art that many changes and modifications can be made without departing from the spirit or scope of the invention as set forth herein.

According to the present invention, as has been described above, the control device is so constructed that a comparison is made between the output of the timer circuit in which the counted value circulates in accordance with the period of the TDMA frame and the preset value so as to produce the strobe signal. Therefore, the control device can bring about advantages that the timing control can be effected without the intervention of the control unit such as a CPU, and hence the real-time control is made possible, and the change in timing can easily be made.

If the control device is so constructed that a comparison is made between the counted value obtained by shifting the counted value of the first timer circuit by the amount of correction of the transmission timing and the preset value so as to produce the strobe signal to be applied to the radio transmitting unit, the control device can also bring about advantages, as well as the above-described advantages, that the timing control in the transmission system can easily be realized and the change in timing in the same system can easily be performed.

What is claimed is:

1. A control device suitable for use in a radio communication device, comprising:
   a timer circuit for counting the number of master clocks supplied from the outside and for circulating values of the thus-counted master clocks in a period corresponding to a predetermined number of master clocks;
   a strobe signal generating circuit for comparing one of the values of the master clocks counted by said timer circuit and a preset value so as to output a strobe signal to a radio unit when they coincide with each other; and
   a control circuit for setting said predetermined number of master clocks to said timer circuit and for setting the preset value to said strobe signal generating circuit.

2. A control device according to claim 1, wherein each value obtained by dividing one frame time corresponding to a TDMA frame by the period of the master clocks is set in said timer circuit as the predetermined number of master clocks.

3. A control device according to claim 1, wherein said strobe signal generating circuit is provided with a comparing circuit for comparing one of the counted values of said timer circuit and a preset value supplied from said control circuit so as to generate a strobe signal therefrom when they coincide with each other.

4. A control device according to claim 3, wherein said comparing circuit comprises an input register for receiving the value set by said control circuit, an output register for receiving the contents of the set value of said input register set based on a signal outputted when said timer circuit counts the predetermined number of master clocks, a latch circuit for latching the values counted by said timer circuit therein based on said predetermined number of master clocks, a comparator for comparing one of the values stored in said output register and one of the values latched in said latch circuit so as to output a coincidence detection signal therefrom when they coincide with each other, and an output latch circuit for latching said coincidence detection signal on the basis of said predetermined number of master clocks so as to output a strobe signal therefrom.

5. A control device suitable for use in a radio communication apparatus, comprising:
   a timer circuit for counting the number of master clocks supplied from the outside and for circulating values of the thus-counted master clocks in a period corresponding to a predetermined number of master clocks;
   a strobe signal generating circuit for comparing the values of the master clocks counted by said timer circuit and a plurality of preset values respectively so as to output a plurality of strobe signals produced at the time that one of the counted values coincides with one of said plurality of preset values to a radio unit; and
   a control circuit for setting said predetermined number of master clocks to said timer circuit and for setting said plurality of preset values to said strobe signal generating circuit.

6. A control device according to claim 5, wherein each value obtained by dividing one frame time corresponding to a TDMA frame by the period of the master clocks is set in said timer circuit as the predetermined number of master clocks.

7. A control device according to claim 5, wherein said strobe signal generating circuit is provided with a plurality of comparing circuits each serving to compare one of the counted values of said timer circuit and one of said plurality of preset values supplied from said control circuit so as to generate a strobe signal when they coincide with each other.

8. A control device according to claim 7, wherein said plurality of comparing circuits each comprise an input register for receiving a value set by said control circuit, an output register for receiving the contents of the set value of said input register set based on a signal outputted when said timer circuit counts the predetermined number of master clocks, a latch circuit for latching the values counted by said timer circuit therein based on said predetermined number of master clocks, a comparator for comparing one of the values stored in said output register and one of the values latched in said latch circuit so as to output a coincidence detection signal therefrom when they coincide with each other, and an output latch circuit for latching said coincidence detection signal based on said predetermined number of master clocks so as to output a strobe signal therefrom.

9. A control device according to claim 5, further comprising pulse-width expanding means activated by first and second of said plurality of strobe signals for producing a signal having a pulse width broader than that of each signal strobe signal of said first and second strobe signals and substantially equal to the time period between said first and second strobe signals.

10. A control device according to claim 9, wherein said pulse-width expanding means includes a flip-flop set by said first strobe signal and reset by said second strobe signal.

11. A control device according to claim 9, wherein said pulse-width expanding means comprises a counter circuit to which a count value corresponding to a pulse width is set and for starting the countdown taking one of said plurality of strobe signals as the trigger, and a flip-flop set by said one strobe signal and reset by a borrow signal outputted from said counter circuit.

12. A control device according to claim 5, further comprising serial data outputting means for serially outputting predetermined data according to a strobe signal.

13. A control device according to claim 12, wherein said serial data outputting means includes a register in which predetermined data is set, and an output circuit for receiving said predetermined data set in said register provided that a strobe signal is taken as the trigger so as to output said predetermined data therefrom in synchronism with a master clock.

14. A control device according to claim 5, wherein said strobe signal generating circuit comprises a data updating circuit in which one of a plurality of preset values and information representing the output destination of a strobe signal corresponding to each preset value are set in pairs, and for outputting one of said one preset value and said information set in a pair when a coincidence detection signal is inputted and for preparing the following preset value and information to be outputted in a pair, a comparing circuit for comparing a value counted by said timer circuit and said preset value from said data updating circuit so as to output said coincidence detection signal when they coincide with each other, and a selection circuit for outputting a strobe signal corresponding to said coincidence detection signal to the output destination corresponding to said information from said data updating circuit.

15. A control device according to claim 7, further comprising correcting means for correcting a shift in the receiving timing of received data.

16. A control device according to claim 15, wherein said correcting means comprises a unique word detecting circuit for detecting a unique word from the received data, and a latch circuit for latching therein each value counted by said timer circuit based on a detection signal from said unique word detecting circuit and for providing each value thus latched to said control circuit as a correction value.

17. A control device according to claim 7, further comprising a frame-number counter for counting a signal outputted when said timer circuit counts the predetermined number of master clocks and for circulating values counted by said timer circuit taking each value equal to the number of TDMA frames in a super frame as a period, an active frame detector for outputting a receive start signal when a preset value coincides with one of said counted values, and a gate circuit for passing said signal from said timer circuit so as to be supplied to said control circuit as a frame interrupt signal provide that said receive start signal from said active frame detector is taken as a gate signal.

18. A control device suitable for use in a radio communication apparatus, comprising:
a first timer circuit for counting the number of master clocks supplied from the outside and for circulating values of the thus-counted master clocks in a period corresponding to a predetermined number of master clocks;
a first strobe signal generating circuit for comparing one of the values of the master clocks counted by said first timer circuit and a preset value so as to output a strobe signal to a radio receiving unit when they coincide with each other;
a comparing circuit for comparing said one value counted by said first timer circuit and a timing correction value so as to output a trigger signal when they coincide with each other;
a second timer circuit for starting the counting of the number of the master clocks in synchronism with said trigger signal;
a second strobe signal generating circuit for comparing one of values of the master clocks counted by said second timer circuit and a preset value for transmission so as to output a strobe signal to a radio transmitting unit when they coincide with each other; and
a control circuit for setting said predetermined number of master clocks to said first timer circuit and for setting said preset value to said first strobe signal generating circuit, said control circuit being further adapted to set a timing correction value to said comparing circuit and for setting said preset value for transmission to said second strobe signal generating circuit.

19. A control device according to claim 18, wherein each value obtained by dividing one frame time corresponding to a TDMA frame by the period of the master clocks is set in said first timer circuit as the predetermined number of master clocks.

20. A control device according to claim 18, wherein said first strobe signal generating circuit is provided with a comparing circuit serving to compare one of the values counted by said first timer circuit and one of preset values supplied from said control circuit so as to generate a strobe signal when they coincide with each other, and said second strobe signal generating circuit is provided with a comparing circuit for comparing one of the values of the master clocks counted by said second timer circuit and the preset value for transmission given from said control circuit so as to generate a strobe signal therefrom when they coincide with each other.

21. A control device according to claim 18, wherein said comparing circuit comprises an input register in which the amount of correction of the transmission timing produced based on the amount of correction of the transmission timing designated by a base station is set, an output register in which the contents of said register are set based on a signal outputted when said first timer circuit counts a predetermined number of master clocks, a latch circuit for latching the values counted by said first timer circuit therein based on said predetermined number of master clocks, a comparing circuit for comparing one of the values stored in said output register and one of the values latched in said latch circuit so as to output a trigger signal therefrom when they coincide with each other, and an output latch circuit for latching said trigger signal based on said predetermined number of master clocks.

22. A control device suitable for use in a radio communication apparatus, comprising:
a first timer circuit for counting the number of master clocks supplied from the outside and for circulating values of the thus-counted master clocks in a period corresponding to a predetermined number of master clocks;

a first strobe signal generating circuit for comparing the values of the master clocks counted by said first timer circuit and a plurality of preset values respectively so as to output a plurality of strobe signal produced at the time that one of the values coincides with one of said plurality of preset values to a radio receiving unit;

a comparing circuit for comparing said one value counted by said first timer circuit and a timing correction value so as to output a trigger signal when they coincide with each other;

a second timer circuit for starting the counting of the number of the master clocks in synchronism with said trigger signal;

a second strobe signal generating circuit for comparing values of the master clocks counted by said second timer circuit and a plurality of preset values for transmission respectively so as to output a plurality of strobe signals produced at the time that one of said values coincides with one of said plurality of preset values for transmission to a radio transmitting unit; and a control circuit for setting said predetermined number of master clocks to said first timer circuit and for setting said plurality of preset values to said first strobe signal generating circuit, said control circuit being further adapted to set a timing correction value to said comparing circuit and for setting said plurality of preset values for transmission to said second strobe signal generating circuit.

23. A control device according to claim 22, wherein each value obtained by dividing one frame time corresponding to a TDMA frame by the period of the master clocks is set in said first timer circuit as the predetermined number of master clocks 24. A control device according to claim 22, wherein said first strobe signal generating circuit is provided with a plurality of comparing circuits each serving to compare one of the values counted by said first timer circuit and one of a plurality of preset values supplied from said control circuit so as to generate a strobe signal when they coincide with each other, and said second strobe signal generating circuit is provided with a plurality of comparing circuits each serving to compare one of the values of the master clocks counted by said second timer circuit and one of a plurality of preset values for transmission given from said control circuit so as to generate a strobe signal therefrom when they coincide with each other.

25. A control device according to claim 22, wherein said comparing circuit comprises an input register in which the amount of correction of the transmission timing produced based on the amount of correction of the transmission timing designated by a base station is set, an output register in which the contents of said register are set based on a signal outputted when said first timer circuit counts a predetermined number of master clocks, a latch circuit for latching the values of the master clocks counted by said first timer circuit therein based on said predetermined number of master clocks, a comparing circuit for comparing one of the values stored in said output register and one of the values latched in said latch circuit so as to output a trigger signal therefrom when they coincide with each other, and an output latch circuit for latching said trigger signal on the basis of said predetermined number of master clocks.

26. A control device according to claim 22, further comprising correcting means for correcting a shift in the receiving timing of received data.

27. A control device according to claim 26, wherein said correcting means comprises a unique word detecting circuit for detecting a unique word from the received data, and a latch circuit for latching each value counted by said first timer circuit in response to a detection signal from said unique word detecting circuit and for providing each value thus latched to said control circuit as a correction value.

28. A control device according to claim 22, further comprising a frame-number counter for counting a signal outputted when said first timer circuit counts the predetermined number of master clocks and for circulating values of the master clocks counted by said first timer circuit taking each value equal to the number of TDMA frames in a super frame as a period, an active frame detector for outputting a receive start signal when a preset value coincides with one of said counted values, and a gate circuit for passing said signal from said timer circuit so as to be supplied to said control circuit as a frame interrupt signal provide that said receive start signal from said active frame detector is taken as a gate signal.

* * * * *

UNITED STATES PATENT AND TRADEMARK OFFICE
CERTIFICATE OF CORRECTION

PATENT NO. : 5,237,592
DATED : August 17, 1993
INVENTOR(S) : T. Nonami

It is certified that error appears in the above-identified patent and that said Letters Patent is hereby corrected as shown below:

Col. 6, lines 36-39, delete "down taking a strobe signal n as the trigger, and resets the FF 50 in response to a borrowing signal. Thus the signal having the pulse width corresponding to each count".

Col. 15, line 6, "signal" should be --signals--.

Signed and Sealed this

Twenty-ninth Day of March, 1994

Attest:

BRUCE LEHMAN

*Attesting Officer*     *Commissioner of Patents and Trademarks*